United States Patent [19]

Knight

[11] Patent Number: 5,172,324
[45] Date of Patent: Dec. 15, 1992

[54] ELECTRONIC STEERING SYSTEM

[75] Inventor: Steven J. Knight, Mapleton, Minn.

[73] Assignee: Johnson Fishing Inc., Mankato, Minn.

[21] Appl. No.: 537,586

[22] Filed: Jun. 14, 1990

[51] Int. Cl.$^5$ ............................................. B63H 25/04
[52] U.S. Cl. ..................................... 364/457; 318/588; 114/144 E
[58] Field of Search ................. 364/457, 447; 318/588; 114/144 E

[56] References Cited

U.S. PATENT DOCUMENTS

| | | | |
|---|---|---|---|
| 3,811,394 | 5/1974 | Lathers | 114/144 R |
| 3,927,635 | 12/1975 | Masuzawa et al. | 114/144 E |
| 3,943,764 | 3/1976 | Greene | 364/457 X |
| 3,965,840 | 6/1976 | Blumberg | 114/144 B |
| 4,038,528 | 7/1977 | Fowler | 364/457 |
| 4,103,638 | 8/1978 | Fowler | 114/144 E |
| 4,223,624 | 9/1980 | Iyeta | 114/144 E |
| 4,253,149 | 2/1981 | Cunningham et al. | 364/444 |
| 4,542,464 | 9/1985 | Kramer | 364/457 |
| 4,564,909 | 1/1986 | Kramer | 364/457 |
| 4,590,570 | 5/1986 | Rader | 364/452 |
| 4,692,868 | 9/1987 | Wesner et al. | 364/447 |

Primary Examiner—Thomas G. Black
Attorney, Agent, or Firm—Foley & Lardner

[57] ABSTRACT

A device for controlling the heading of a water craft using a propulsion device which pulls the water craft is disclosed. The device includes a motor with a variable thrust orientation and a controller for controlling the direction of the thrust of the motor. A feedback circuit, including a compass in a substantially fixed relationship to the motor, provides a feedback signal to the controller indicative of the direction of the thrust of the motor. A heading designator provides a desired heading signal to the controller. The controller maintains the heading of the water craft in the desired heading in response to the desired heading signal and the feedback signal by varying the orientation which is of the thrust.

16 Claims, 9 Drawing Sheets

ELECTRONIC STEERING SYSTEM

TECHNICAL FIELD

This invention relates, generally, to electronic steering systems used to maintain a target magnetic heading of a water craft, and, in particular, to an electronic steering system used on a fishing boat.

BACKGROUND OF THE INVENTION

Use of electronic steering systems in boats has become very popular. Such systems are used to maintain a target heading by a boat without requiring a person to steer the boat.

The basic function of any electronic steering system of a boat is to establish and generally maintain a predetermined (target) heading of the boat by adjusting the current heading of the boat in response to deviations of the current heading from the predetermined (target) heading. A variety of electronic steering systems are disclosed in U.S. Pat. Nos. 4,103,638 issued to Fowler; 3,965,840 issued to Blumberg; 4,590,570 issued to Rader; and 4,542,464 and 4,564,909 issued to Kramer.

These known systems are generally used with stern-mounted motors. In order to direct a boat having a stern-mounted motor to a target heading, the direction of thrust of the motor must be in a direction other than the target direction. Furthermore, as the current heading of the boat approaches the target heading, the difference between the direction of thrust and the target heading of the boat must be reduced, in order to prevent the current heading of the boat from greatly overshooting the target heading. Thus, electronic steering systems used with stern-mounted motors require two direction sensors, one to sense the current heading of the boat, and one to sense the direction of the thrust of the motor relative to the current heading of the boat. The hardware and software of an electronic steering system used with a stern-mounted system must be able to determine if a steering correction is needed, the direction of the steering correction, and the magnitude of the steering correction. The magnitude of the steering correction is needed to set the difference between the direction of thrust of the motor and the current heading of the boat, and adjust this difference as the current heading of the boat approaches the target heading. The use of two sensors, as well as hardware and software capable of changing the magnitude of correction, increases the cost of the electronic steering system.

Some known systems require external radio signals to determine the location of the boat, and then calculate the correction necessary to maintain the target heading. Systems such as these may be useful on boats travelling great distances in large bodies of water but are unnecessarily elaborate and expensive for use on boats travelling on small lakes.

The electronic steering system of the present invention is adaptable to be used on a bow-mounted motor and advantageously requires a single direction sensor. Also, the hardware and software required to implement the electronic steering system of the present invention need only be capable of determining whether a steering correction is needed and the direction of the correction. The electronic steering system of the present invention is easy to use, including a manual override feature. Furthermore, the present invention internally provides signals corresponding to both the predetermined heading and the current heading, to obviate the need for external radio signals indicating location, thus making the electronic steering system less complicated and less expensive.

Therefore, an object of the electronic steering system of the present invention is to be adaptable for use on a bow-mounted motor and advantageously requires a single direction sensor. Furthermore, it is an object of the present invention that the hardware and software required to implement the electronic steering system of the present invention need only be capable of determining whether a steering correction is needed and the direction of the correction, and that a manual override is included. Another object of the present invention is that signals corresponding to both the predetermined heading and the current heading are provided internally, to obviate the need for external radio signals indicating location.

SUMMARY OF THE INVENTION

The electronic steering system of the present invention controls the direction of a watercraft having a propulsion device that pulls the watercraft, and comprises a direction means for directing the thrust of the propulsion device, control means for controlling the direction means, feedback means for providing a feedback signal to the control means, wherein the feedback signal is indicative of the direction of thrust, and direction designating means for designating a desired direction. The direction designating means provides a desired direction signal, which is representative of said desired direction, to the control means. The direction means, control means, feedback means, and direction designating means cooperate to maintain the watercraft in the desired direction.

DESCRIPTION OF THE PREFERRED EMBODIMENT

The electronic steering system of the present invention is adaptable to be used with a thrust motor that leads (pulls) a boat. A boat having a thrust motor that pulls the boat (a motor that precedes the center of gravity of the boat in the direction of travel) will, if the heading of the thrust motor is held constant, eventually follow the thrust motor and travel in the heading of the thrust motor. Examples of thrust motors that pull a boat include: a bow-mounted trolling motor (thrust motor) used with a fishing boat; a stern-mounted trolling motor that pulls a fishing boat in a direction opposite to that of normal travel; and a motor mounted on the bow end of the platform of a pontoon boat, where the pontoons extend past the bow edge of the platform. In any event, a thrust motor that pulls a boat is a motor positioned such that the boat is directed to a given heading by directing the thrust motor to the given heading. To use the electronic steering system of the present invention with a boat a user engages the electronic steering system of the present invention and manually steers the thrust motor to a target heading. The electronic steering system of the present invention stores the heading to which the user manually steered as the target heading and continuously monitors the current heading of the thrust motor. After a target heading has been selected, the electronic steering system of the present invention periodically compares the current heading of the thrust motor to the target heading selected by the user. If the difference between the current heading of the thrust motor and the target heading exceeds a predetermined threshold, the electronic steering system of the present invention steers the thrust motor to the target heading, thereby leading the boat to the desired heading. For example, as the current heading of a boat using the electronic steering system of the present invention drifts to the left of the target heading, the electronic steering system steers the thrust motor to the right.

When a target heading has been set and the electronic steering system of the present invention determines that a steering correction is required, the electronic steering system of the present invention rotates the thrust motor for a short period of time, thereby changing the direction of thrust, which is established by the rotation of a propeller on the thrust motor. The electronic steering system of the present invention continues to monitor the current heading of the thrust motor, and, if additional correction is needed, the thrust motor is again rotated, in the appropriate direction.

Figure 1:
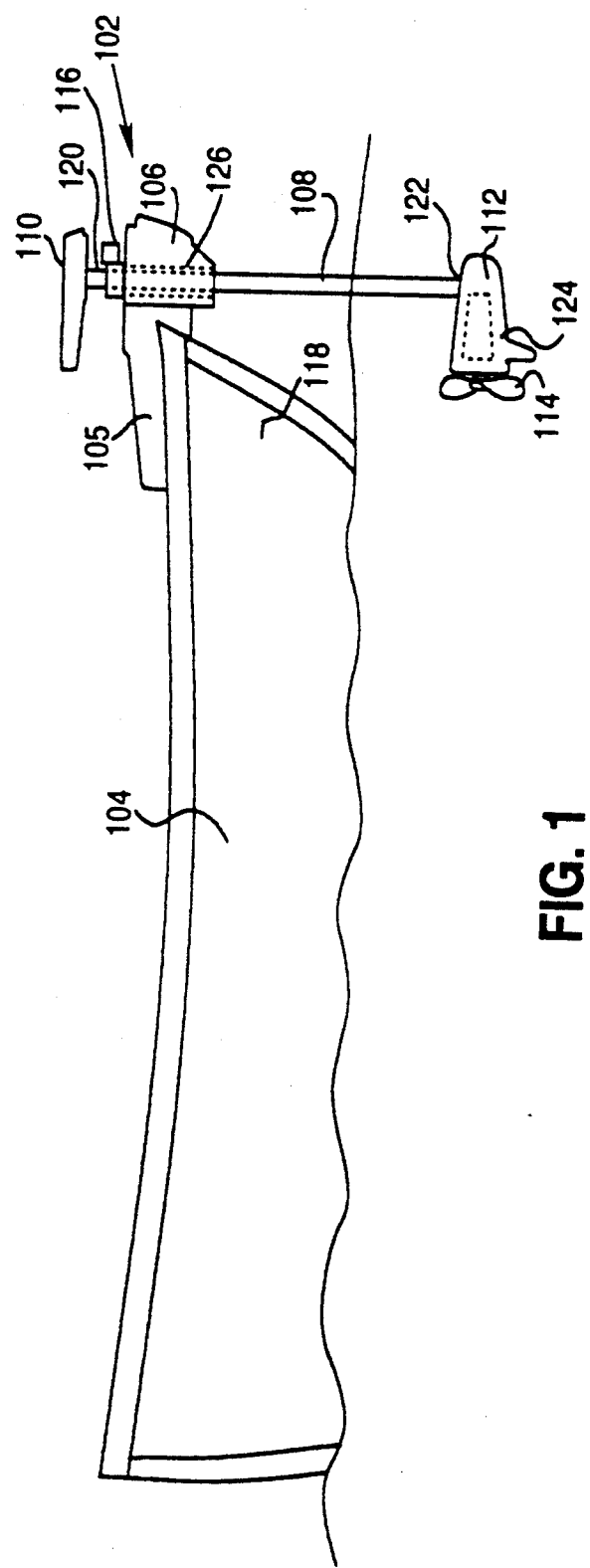
FIG. 1 is an illustration of a boat employing the present invention.

FIG. 1 is an illustration of a boat employing the present invention. Referring to FIG. 1, the electronic steering system of the present invention is employed for use with a trolling unit 102. Trolling unit 102 includes a base assembly 105, which is mounted to a bow 118 of a fishing boat 104 using bolts or any other convenient manner. Trolling unit 102 includes a control head 110, a steering motor 106, a collar 116, a shaft 108, a motor housing 112, and a propeller 114.

Shaft 108 has a first end 120 and a second end 122. Control head 110 is suitably comprised of a rigid, non-magnetic material, such as hard plastic, and is affixed to first end 120 such that control head 110 will rotate in the event that shaft 108 is rotated. Second end 122 of shaft 108 is affixed to motor housing 112 such that when shaft 108 is rotated, motor housing 112 also rotates. Propeller 114 is affixed to motor housing 112. Therefore, as shaft 108 is rotated, and control head 110 and motor housing 112 rotate, the direction of thrust, established by rotation of propeller 114, changes. Thus, for example, to steer right, shaft 108 may be rotated clockwise (as viewed from above); and to steer left, shaft 108 may be rotated counter-clockwise (as viewed from above). Shaft 108 is preferably comprised of a rigid material, such as steel, and is hollow, containing power lines to provide power to an electric thrust motor 124, disposed within motor housing 112.

Steering motor 106 includes a hollow portion 126. Hollow portion 126 is configured to slidingly receive shaft 108. Shaft 108 is maintained in proper relation to steering motor 106 by collar 116, which is mounted on shaft 108. Steering motor 106 rotatably engages shaft 108 such that when steering motor 106 is activated shaft 108 rotates, thereby changing the direction of thrust, established by the rotation of propeller 114, of trolling unit 102. Because trolling unit 102 is bow-mounted, boat 104 will always travel in the direction of thrust, established by the rotation of propeller 114, of trolling unit 102; thus, to steer boat 104 to a target heading the thrust of trolling unit 102 is simply directed to the target heading. The preferred embodiment of the present invention illustrated in FIG. 1 provides for steering motor 106 to be activated by the electronic steering system of the present invention when the current heading of boat 104 deviates from the target heading by more than a predetermined limit. As will be described below with reference to FIG. 2, a user may manually override the electronic steering system and manually steer to a new current heading. When a user overrides the electronic steering system and steers to a new current heading, the new current heading is stored by the electronic steering system as a new target heading.

Figure 2:
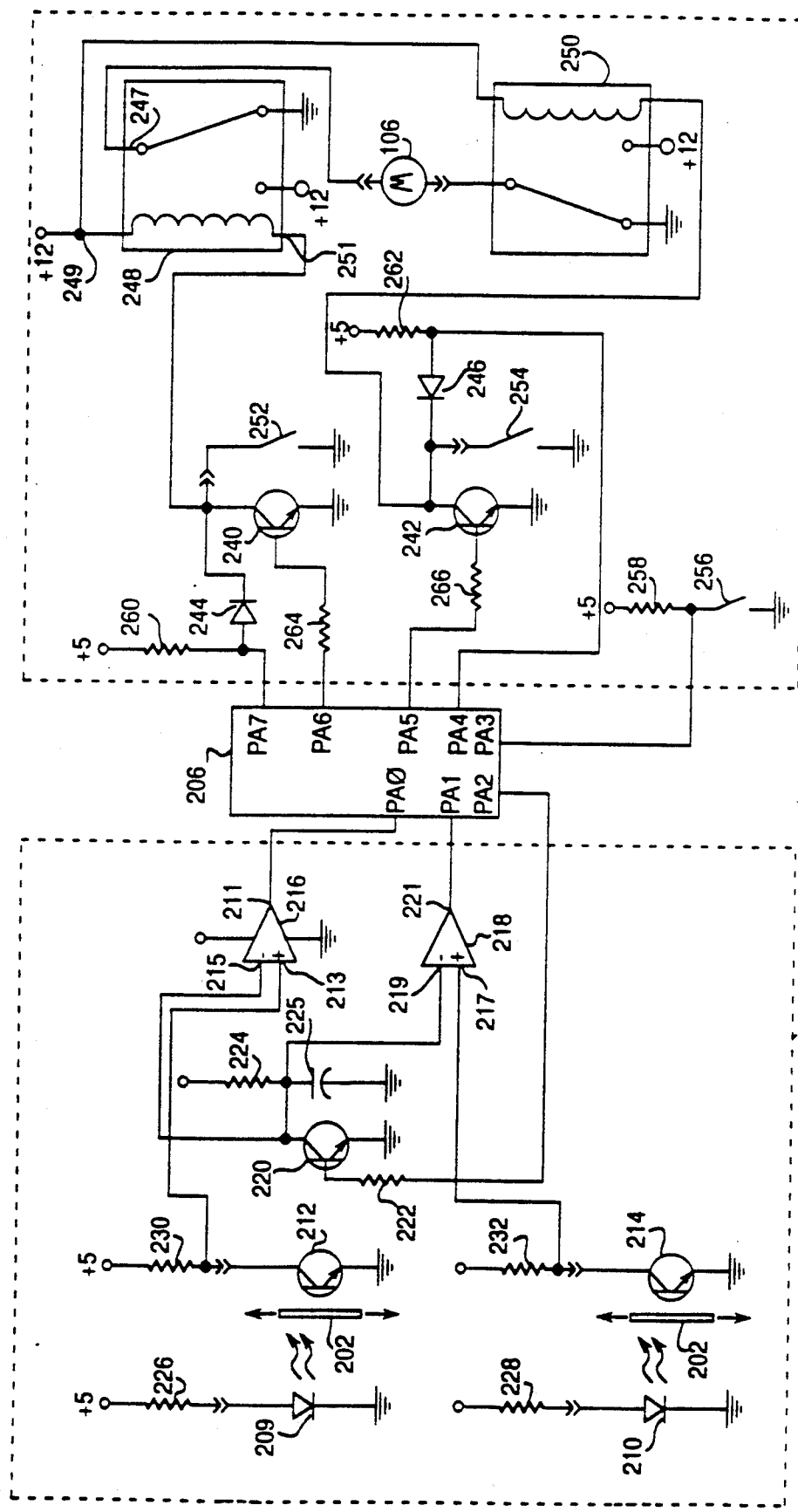
FIG. 2 is an electrical schematic drawing of the preferred embodiment of the present invention.

FIG. 2 is an electrical schematic drawing of the preferred embodiment of the present invention. Since boat 104 always follows a course established by trolling unit 102 a single compass may be used to determine the current heading of both trolling unit 102 and boat 104. Referring to FIG. 2, a compass 202, mounted in control head 110, is part of a heading detector 204, which, with a microprocessor 206, a steering circuit 208, and steering motor 106 are included in the preferred embodiment of the present invention.

Microprocessor 206, the operation of which is described below, is provided with a plurality of inputs and outputs PA0-PA7. Inputs and outputs PA0-PA7, which will be described in detail below, are provided for the following purposes: PA0 and PA1 are inputs to microprocessor 206, received from heading detector 204, representative of the current heading of compass 202; PA2 is an output provided by microprocessor 206 to prompt heading detector 204; PA3 is an input received by microprocessor 206, from steering circuit 208, to enable or disable the electronic steering system of the present invention; PA5 and PA6 are outputs provided by microprocessor 206 to steering circuit 208 to control steering motor 106; and PA4 and PA7 are inputs received by microprocessor 206, from steering circuit 208, which indicate when a user is manually overriding the electronic steering system of the present invention and setting a new target heading.

Input PA3 is provided to microprocessor 206 by steering circuit 208 to enable or disable the electronic steering system of the present invention. When input PA3 is cleared (sent LOW) by steering circuit 208, microprocessor 206 is disabled, thereby disabling the electronic steering system of the present invention. When input PA3 is set (sent HIGH) by steering circuit 208, microprocessor 206 is enabled, thereby enabling the electronic steering system of the present invention.

Microprocessor 206 periodically prompts heading detector 204 via output PA2, and receives signals on inputs PA0 and PA1 representative of the current heading of compass 202 from heading detector 204, in response to the prompt. Microprocessor 206 clears (sends LOW) output PA2, which is provided to heading detector 204, to prompt heading detector 204 to provide signals on inputs PA0 and PA1. Heading detector 204 monitors output PA2 and, in response to output PA2 being cleared (sent LOW), clears (sends LOW) input PA0 after a time delay having a duration representative of the current heading of compass 202. Heading detector 204 also clears (sends LOW) input PA1 after a time delay having a duration representative of the current heading of compass 202. Thus, microprocessor 206 is provided with time delayed signals representative of the current heading of compass 202.

Microprocessor 206, in response to inputs PA4 and PA7, either compares the time delay signals representative of the current heading of compass 202 to stored time delay signals representative of a target heading, or stores the time delay signals representative of the current heading of compass 202 as a new target heading. When a user is manually steering boat 104 to a new heading, steering circuit 208 clears (sends LOW) one of inputs PA4 or PA7 (steering circuit 208 will be described in detail later). Microprocessor 206, upon detecting a LOW input PA4 or a LOW input PA7, waits until inputs PA4 and PA7 are HIGH and then stores the current heading of compass 202 as the new target heading. Thus, microprocessor 206 stores the current heading, when the user stops manually overriding the electronic steering system of the present invention, as the new target heading.

When neither input PA4 nor input PA7 are LOW, microprocessor 206 determines if the current heading of boat 104 has deviated from the target heading by more than the predetermined threshold by comparing the signals representative of the current heading of compass 202 and the stored signals representative of the target heading. If the difference between the signals representative of the current heading of compass 202 and the stored signals representative of the target heading exceeds a predetermined limit, indicating the current heading of boat 104 has deviated from the target heading by more than the predetermined threshold, microprocessor 206 activates steering motor 106 and the direction of thrust of trolling unit 102 is changed.

Microprocessor 206 activates steering motor 106 by setting (sending HIGH) one of outputs PA5 or PA6. When output PA5 is set steering circuit causes boat 104 to be steered to the right, and when output PA6 is set steering circuit 208 causes boat 104 to be steered to the left.

Referring to FIGS. 9A-9D, compass 202, part of heading detector 204 (FIG. 2), is comprised of: a housing 902 having first and second surfaces 904 and 906; a pair of cylindrical projections 908 and 909 on surface 904; a pair of cylindrical projections on surface 906, directly opposite projections 908 and 909, collectively represented by 910; a cylindrical projection 950 on surface 904; a cylindrical projection 951 on surface 906, directly opposite projection 950; a cylindrical projection 912 on surface 906; a plurality of flanges 915, 917 and 919, each having one of a plurality of mounting holes 914, 916 and 918; an inner disk 923; and an optical disk 903 mounted on inner disk 923.

Housing 902, including surfaces 904 and 906, is comprised of a transparent rigid material, such as hard plastic, and is filled with a damping fluid, preferably one similar to alcohol. Projection 912 is provided to receive one end of a needle 949. A jewel 913 is mounted on inner disk 923 and receives the other end of needle 949. Needle 949, jewel 913 and projection 912 cooperate to allow inner disk 923 to rotate freely within housing 902.

Projections 908 and 909 are provided to house a pair of light emitting diodes (209 and 210 of FIG. 2) and projections 910 are provided to house a pair of photo-transistors (212 and 214 of FIG. 2). A circuit board 920 (show in FIG. 9B) is provided, upon which the diodes are mounted. Circuit board 920 is affixed by a screw (not shown) which passes through circuit board 920 and engages projection 950. Mounting holes 914, 916 and 918 are provided to mount compass 202 within control head 110, in a conventional manner, therefore as the direction of thrust is changed by rotating shaft 108, the orientation of compass 202 also changes. Transistors 212 and 214 are mounted on a circuit board 922, which is affixed to projection 951. The light emitting diodes and photo-transistors are provided to determine the orientation of optical disk 903, as will be described in detail later.

A plurality of isolators 924 (FIG. 9C) are provided to reduce the vibrations transmitted to compass 202 from trolling unit 102. The isolators are conveniently formed of silicon rubber and are inserted into mounting holes 914, 916 and 918. Isolators 924 include a hollow cylindrical portion 926 for receiving a mounting screw, and are inserted into each of mounting holes 914, 916 and 918 such that an annular recess 928 of each of isolators 924 cooperates with flanges 915, 917, and 919 to secure isolators 924 in the proper position.

Inner disk 923 is provided with receptacles 925 and 927 to receive dual bar magnets 905 and 907. Dual bar magnets 905 and 907 are friction fit within receptacles 925 and 927. Dual bar magnets 905 and 907 cause inner disk 923 to rotate so as to maintain a given angular orientation relative to magnetic north. Optical disk 903 is mounted on inner disk 923 such that optical disk 903 rotates as inner disk 923 rotates. Thus, as housing 902 is rotated relative to magnetic north, inner disk 923 and optical disk 903 rotate relative to housing 902.

Optical disk 903 is comprised of a transparent rigid substrate, with shading applied using a photographic process. The shading is preferably comprised of alternating opaque and transparent lines of varying widths. The level of shading that is applied is dependent on the angular position, such that the shading of optical disk 903 is nearly transparent at 180° (south) and nearly opaque at 360 (north). The level of shading varies between 180°-360° in a uniform manner in both the clockwise and counter-clockwise directions so that the amount of light that passes through optical disk 903 at 90° and 270° is approximately one-half of the amount of light that passes through optical disk 903 at 180°. The shading level is most accurate in the regions in which light that is incident upon optical disk 903 is attenuated between 25% and 75%, i.e., between 45° and 135°, and between 225° and 315°.

Even though the shading level is not accurate over all angular positions, and any shading level is given by two angles (50% shading is found at 90° and 180° e.g.), the orientation of optical disk 903 may be found by determining the shading level beneath both of projections 908 and 909. Projections 908 and 909 are offset by 90° to ensure that, at all times, at least one projection is above the accurate region of optical disk 903 (between 25% and 75% shading). The projection not above the accurate region is used to determine which of the two orientations that provide the detected shading level is the actual orientation. Because the shading level at any point on optical disk 903 is dependent on the amount of light that passes through optical disk 903 at that point, the orientation of optical disk 903 may be determined by measuring the amount of light that passes through optical disk 903 beneath projections 908 and 909. The light emitting diodes housed in projections 908 and 909, and the photo-transistors housed in projections 910, provide a signal having a voltage representative of the amount of light that passes through optical disk 903, as will be described in detail below.

Referring again to FIG. 2, heading detector 204 is comprised of compass 202, infra-red light emitting diodes 209 and 210, photo-transistors 212 and 214, a pair of comparators 216 and 218, a transistor 220, a capacitor 225, and a plurality of resistors 222, 224, 226, 228, 230 and 232. Heading detector 204 continuously monitors the current heading of boat 104 and, in response to output PA2 being cleared (sent LOW), clears inputs PA0 and PA1, each after a time delay having a length dependent on the current heading. Microprocessor 206 compares the duration of the time delays between when output PA2 was cleared and when inputs PA0 and PA1 were cleared to the durations stored which are representative of the target heading. If the difference in time delays is greater than a predetermined limit, indicating boat 104 is off course, microprocessor 206 provides either a right steer (output PA5 is set) or a left steer (output PA6 is set) signal to steering circuit 208. The steering signal applied to steering circuit 208 causes steering motor 106 to turn motor housing 112 either right or left.

Diode 209 and photo transistor 212 cooperate, with compass 202, to provide a voltage to a non-inverting input 213 of comparator 216 which is dependent on the current heading of compass 202. Diode 209 is connected, through current limiting resistor 226, to a 5 volt power supply, causing diode 209 to emit light. A portion of the emitted light, dependent on the current heading of compass 202 as described above, passes through optical disk 903, and impinges on the base of transistor 212. Transistor 212, connected to the power supply through resistor 230, is of the type in which the collector current is dependent on the amount of light impinging on its base. The collector current, in turn, determines the voltage drop across resistor 230 and the voltage at the collector of transistor 212, which is provided to non-inverting input 213 of comparator 216. Thus, the voltage at non-inverting input 213 of comparator 216 is representative of the current heading of compass 202.

Comparator 216 provides an output 211 as input PA0 to microprocessor 206. Output 211 of comparator 216 (and input PA0) is HIGH when the voltage at non-inverting input 213 is greater than the voltage applied to an inverting input 215, and output 211 is LOW when the voltage applied to non-inverting input 213 is less than the voltage applied to inverting input 215. The voltage applied to inverting input 215 of comparator 216 increases, after output PA2 of microprocessor 206 is cleared (sent LOW), over time from an initial voltage that is near zero. Microprocessor 206 monitors the amount of time it takes for output 211 of comparator 216 (input PA0 to microprocessor 206) to be cleared after output PA2 was cleared, which is dependent on the length of time it takes for the voltage applied to inverting input 215 to increase from the initial value to greater than the voltage at non-inverting input 213. Since the voltage at non-inverting input 213 is dependent on the current heading of compass 202, the length of the time it takes for output 211 of comparator 216 (input PA0 of microprocessor 206) to be cleared is also dependent on the current heading of compass 202. Thus, microprocessor 206 monitors a time delay between when output PA2 was cleared and when input PA0 was cleared, which has a duration representative of the current heading of compass 202.

Capacitor 225, resistors 222 and 224, and transistor 220 provide the time increasing voltage, which begins increasing when output PA2 of microprocessor 206 is cleared, to non-inverting input 213 of comparator 216. Microprocessor 206 provides output PA2, through resistor 222, to the base of transistor 220. As long as output PA2 is HIGH, transistor 220 conducts, holding the voltage at the collector of transistor 220 at approximately 0.2 volts. When microprocessor 206 clears output PA2 (sends PA2 LOW), transistor 220 is turned off, and capacitor 225 begins to charge through resistor 224, according to the time constant of resistor 224 and capacitor 225, thereby raising the voltage at the collector of transistor 220. The voltage at the collector of transistor 220 is supplied to inverting input 215 of comparator 216.

When the voltage at inverting input 215 of comparator 216 becomes greater than the voltage at non-inverting input 213, output 211 of comparator 216 (input PA0 of microprocessor 206) changes from HIGH to LOW. As stated above, microprocessor 206 monitors the time delay between when it clears output PA2 (sends PA2 LOW) and when input PA0 becomes LOW. The length of the time delay is thus representative of the current heading of compass 202.

Similarly, diode 210, transistor 214, resistors 228 and 232, and comparator 218 cooperate to provide a time delay input PA1 to microprocessor 206. Diode 210 and transistor 214 provide a voltage to a non-inverting input 217 of comparator 218 which is dependent on the current heading of compass 202. The voltage at the collector of transistor 220 is applied to an inverting input 219 of comparator 218. Microprocessor 206 monitors the time delay from when output PA2 is cleared (sent LOW) to when an output 221 of comparator 218 (input PA1 of microprocessor 206) becomes LOW. This time delay, which is different than the time delay of input PA0 because diodes 209 and 210 are offset by 90°, is also representative of the current heading of compass 202.

Microprocessor 206 uses the stored signals representative of the detected heading as either a current heading which is compared to the target heading to determine if a course correction should be made, or as a new target heading, depending upon the state of inputs PA4 and PA7, as described above. Inputs PA4 and PA7 are provided to microprocessor 206 by steering circuit 208.

Steering circuit 208 includes a pair of transistors 240 and 242, a pair of diodes 244 and 246, a pair of relays 248 and 250, a plurality of switches 252, 254, and 256, and a plurality of resistors 258, 260, 262, 264, and 266. Transistor 240, diode 244, relay 248, switch 252, and resistors 260 and 264 cooperate to steer boat 104 left, either because boat 104 has deviated (to the right) from the target heading, or because a user wishes to select a new target heading. An output 247 of relay 248 is applied to steering motor 106, and causes steering motor 106 to turn motor housing 112 left when output 247 is high (approximately 12 volts). Relay 248 is normally closed, connecting output 247 to ground, but when relay 248 is activated output 247 is connected to a 12 volt power source, typically a lead-acid battery. Relay 248 is activated when a voltage difference is applied across a pair of inputs 249 and 251. Input 249 of relay 248 is connected to a 12 volt power source, and input 251 is connected to the collector of transistor 240 and switch 252, which is a manual override switch. Accordingly, relay 248 is activated by either turning transistor 240 on or by closing switch 252. Transistor 240 is turned on when microprocessor 206 sets output PA6 HIGH. Output PA6 is set when microprocessor 206 determines that the difference between the current heading and the target heading is more than a predetermined threshold, and the current heading is to the right (clockwise as viewed from above) of the target heading.

Switch 252 may include a foot pedal (which may be deflected to a predetermined angle to close switch 252), a hand switch, or any other convenient switch and is provided to allow a user to select a new target heading. When a user closes manual override switch 252 input 251 of relay 248 is brought to ground, activating relay 248. Relay 248, when activated, causes steering motor 106 to turn motor housing 112 left. Input PA7 of microprocessor 206 is cleared (sent LOW) when switch 252 is closed. When input PA7 is LOW, microprocessor 206 waits until input PA7 is set (becomes HIGH) and then stores the current heading as the new target heading. Input PA7 will remain LOW until a user opens manual override switch 252, thus, the new target heading is the heading at which the user stops manually steering boat 104.

Similarly, relay 250, transistor 242, diode 246, switch 254 and resistors 262 and 266 cooperate to steer boat 104 to the right either because boat 104 is off course (to the left), or because a user is manually overriding the electronic steering system. When a user is manually overriding the electronic steering system input PA4 is cleared, causing microprocessor 206 to store the current heading at the time the user stops manually steering, as the new target heading.

Switch 256 is an engage switch, and provides a LOW signal to input PA3 of microprocessor 206 when closed. Microprocessor 206 is disabled by a LOW signal on input PA3, therefore the electronic steering system will not be engaged unless engage switch 256 is open.

Figure 3:
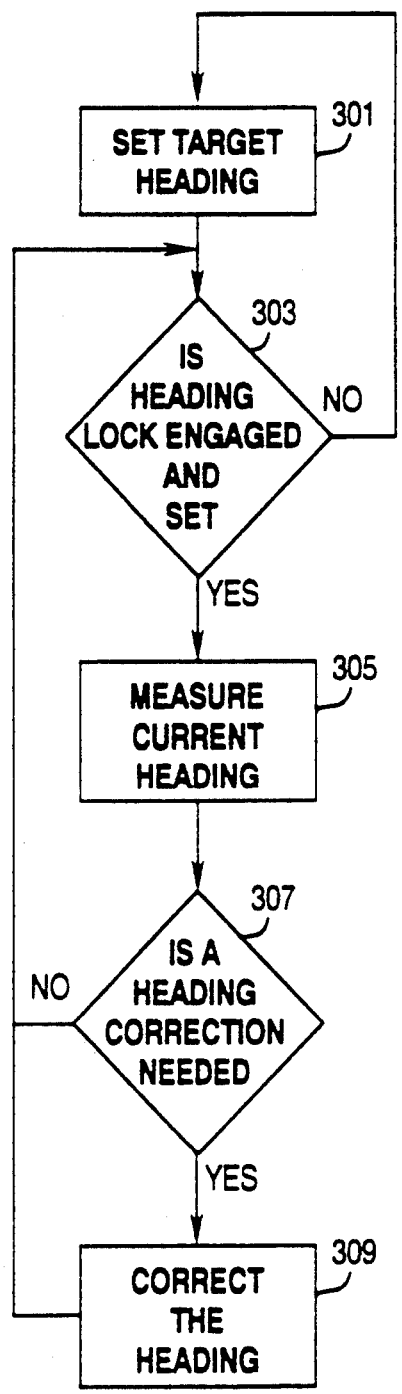
FIG. 3 is a flow chart representing operation of the microprocessor of the preferred embodiment of the present invention.

FIG. 3 is a flow chart representing operation of the microprocessor of the preferred embodiment of the present invention. Referring to FIG. 3, the basic steps implemented by microprocessor 206 includes: setting the target heading (step 301); determining if the electronic steering system is engaged and set(determination 303); measuring the current heading (step 305); determining if a course correction is needed (determination 307); and correcting the heading (step 309). In operation, when the electronic steering system is initially engaged microprocessor 206 determines the current heading and sets the target heading equal to the current heading at step 301. After the target heading has been set, microprocessor 206 determines whether the electronic steering system is engaged (determination 303), as indicated by input PA3 being HIGH, and whether the electronic steering system is set (i.e. if a user is not setting a new target heading), as indicated by one of inputs PA4 or PA7 being HIGH. If one of inputs PA3, PA4 or PA7 is LOW, microprocessor 206 returns to step 301.

If each of inputs PA3, PA4 and PA7 are HIGH, microprocessor 206 measures the current heading (step 305), and determines if a course correction is needed, by calculating the magnitude of the error between the target heading and current headings (determination 307). If no correction is needed at determination 307 microprocessor 206 returns to determination 303. If a correction is needed microprocessor 206 computes the direction the error is, and appropriately activates steering motor 106 for a predetermined length of time (step 309), and then returns to determination 303.

Figure 4A:
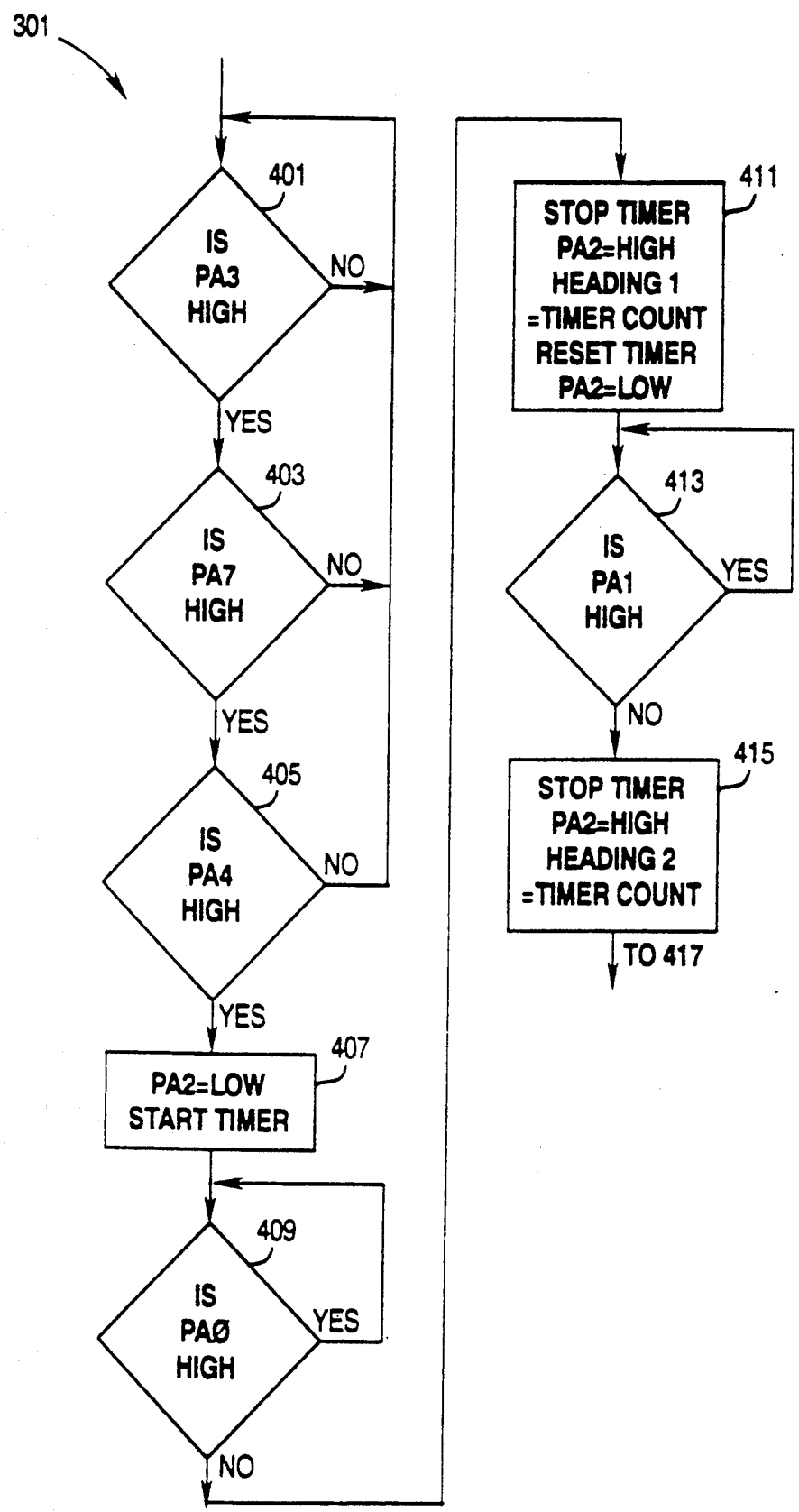
FIGS. 4A and 4B comprise a flow chart illustrating a sub-routine executed by the microprocessor of the preferred embodiment of the present invention to determine the target heading.
Figure 4B:
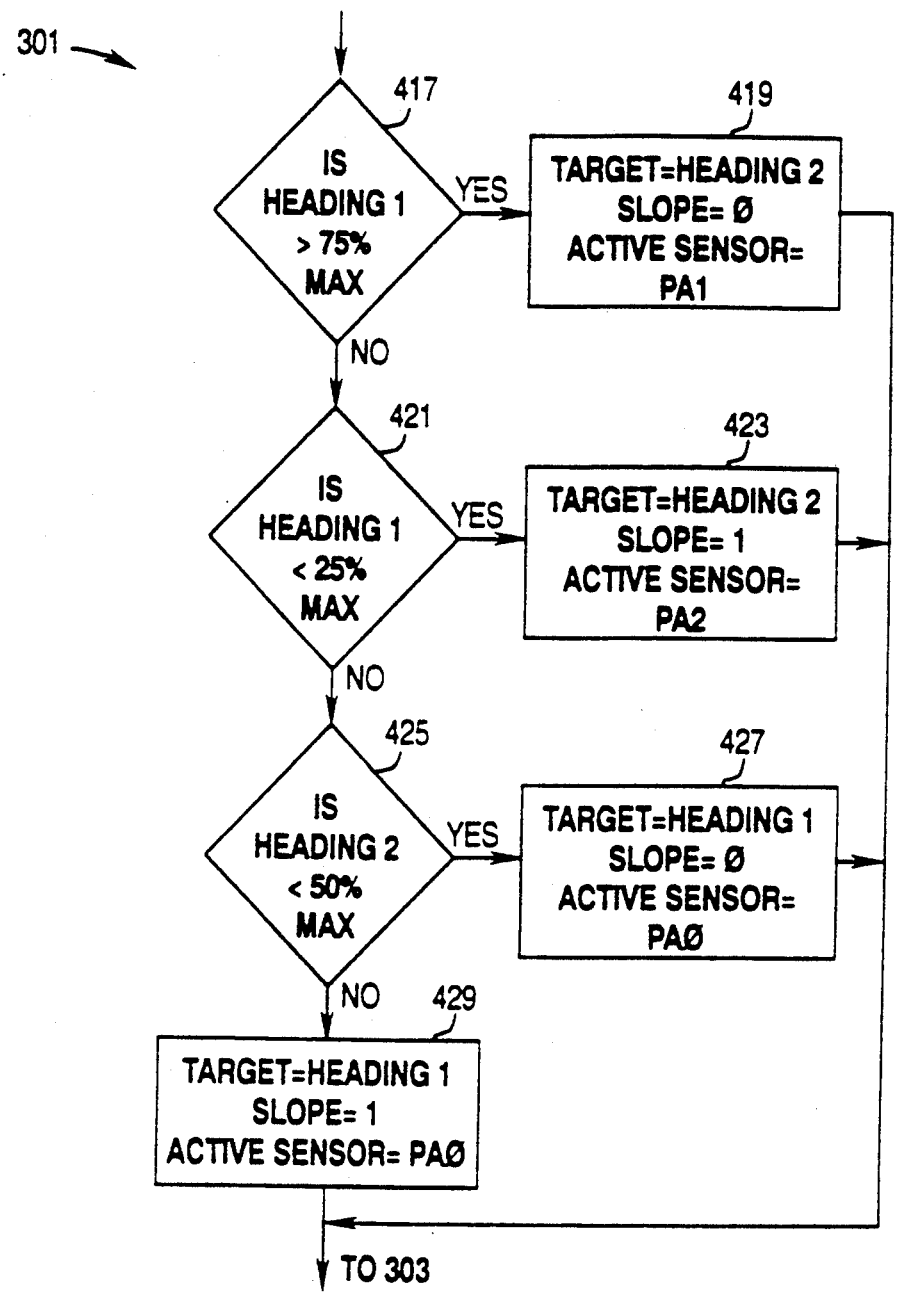

FIGS. 4A and 4B comprise a flow chart illustrating a sub-routine executed by the microprocessor of the preferred embodiment of the present invention to determine the target heading. Referring to FIG. 4A, step 301 includes a plurality of sub-steps 401-429. Microprocessor 206 continually monitors input PA3 until input PA3 is HIGH, indicating the electronic steering system is engaged (determination 401). When the electronic steering system is engaged, microprocessor 206 checks the state of input PA7, to determine if a user is manually steering left and resetting the target heading (determination 403). If input PA7 is LOW, microprocessor 206 returns to determination 401 until the target heading is set, and if input PA7 is HIGH, microprocessor 206 checks the state of input PA4, to determines if a user is manually steering right and resetting the target heading (determination 405). If input PA4 is LOW, microprocessor 206 returns to determination 401 until the target heading is set, and if input PA4 is HIGH, microprocessor 206 stores the current heading as the target heading, in steps 407-515.

Following the determination that the electronic steering system is engaged and a user is not resetting the target heading microprocessor 206 clears output PA2 (sends PA2 LOW) to turn on transistor 220, and begins timing (step 407). Microprocessor 206 monitors the state of input PA0 to determine when the output 211 of comparator 216 becomes LOW (determination 409). When input PA0 becomes low microprocessor 206 stops timing, sets output PA2 (sends PA2 HIGH), stores the time delay as "heading 1", clears the timer, and then clears output PA2 (sends PA2 LOW) and begins timing again (step 411). When output PA2 is set (sent HIGH) capacitor 225 discharges through transistor 220, resetting capacitor 225 for the determination of the time delay on input PA1.

After clearing output PA2 at step 411 microprocessor 206 monitors input PA1 to determine the length of time it takes for the output of comparator 218 to be cleared (determination 413). When input PA1 becomes LOW microprocessor 206 stops the timer, sets output PA2 (sends PA2 HIGH) to turn on transistor 220 and clear capacitor 225, and stores the time as "heading 2" (step 415). After determining the time delays for "heading 1" and "heading 2" microprocessor 206 determines the proper heading in steps 417-429 (FIG. 4B).

Microprocessor 206 evaluates "heading 1" to determine if "heading 1" is greater than 75% of the maximum time (determination 417). If "heading 1" is greater than 75% of the maximum time "heading 2" must be between 25% and 75%, therefore microprocessor 206 sets "target heading" equal to "heading 2", "slope" is set equal to 0, and the "active sensor" is set as input PA1 (step 419). Slope is an internal variable, based on which sensor is in the accurate range and whether the sensor in the inaccurate range is greater than 75% or less than 25%. Slope, thus indicative of which of the two headings that give the detected time delay is the actual heading, is later used to determine whether the thrust motor should be steered to the right or the left. If, at determination 417, "heading 1" was not greater than 75% of the maximum, microprocessor 206 determines if "heading 1" is less than 25% of the maximum (determination 421).

If "heading 1" is less than 25% of the maximum time "heading 2" must be between 25% and 75%, therefore microprocessor 206 sets "target heading" equal to "heading 2", "slope" is set equal to 1, and the "active sensor" is set as input PA1 (step 423). If, at determination 421, "heading 1" was not less than 25% of the maximum, microprocessor 206 determines if "heading 2" (which is not in the accurate range because "heading 1" is in the accurate range) is less than 50% of the maximum (determination 425).

If "heading 2" is less than 50% of the maximum time microprocessor 206 sets "slope" equal to 0, "target heading" equal to "heading 1", and the "active sensor" is set as input PA0 (step 427). If, at determination 421, "heading 2" was not less than 50% of the maximum, microprocessor 206 sets "target heading" equal to "heading 1", "slope" equal to 1, and the "active sensor" as input PA0. Thus microprocessor 206 sets the "target heading" equal to the time delay of the sensor that was in the accurate region, and stores a "slope" value, indicative of which of the two possible headings is accurate, to be used later to determine in which direction a steering correction should be made. Following steps 419, 423, 427 and 429 microprocessor 206 goes to determination 303.

Figure 5:
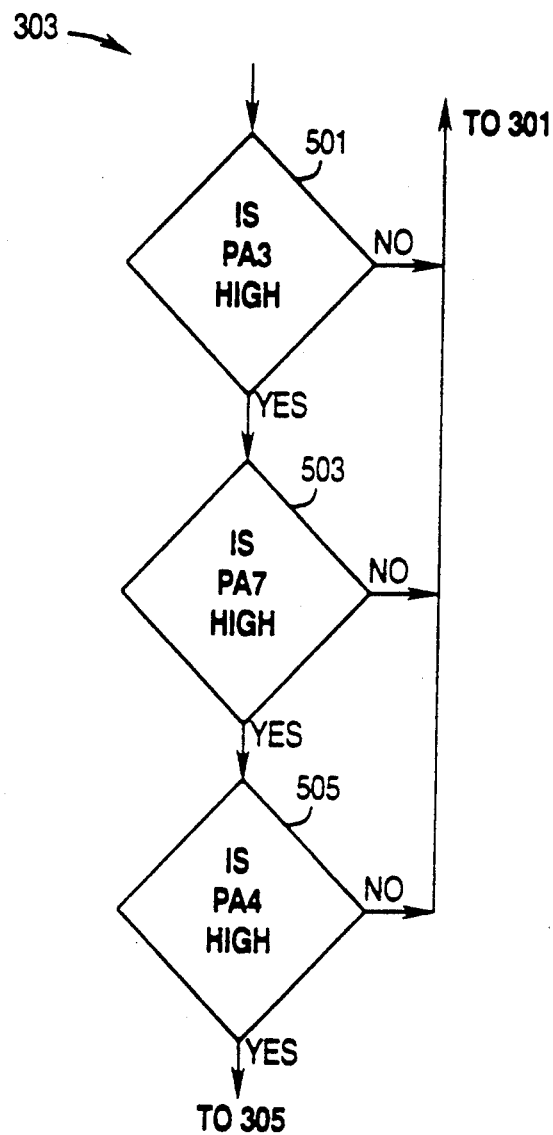
FIG. 5 is a flow chart illustrating a subroutine executed by the microprocessor of the preferred embodiment of the present invention to determine whether the electronic steering system is engaged and set.

FIG. 5 is a flow chart illustrating a subroutine executed by the microprocessor of the preferred embodiment of the present invention to determine whether the electronic steering system is engaged and set. Referring to FIG. 5, determination 303 includes sub-steps 501-503. Microprocessor 206 determines if input PA3 is HIGH (determination 501). If input PA3 is not HIGH, indicating the electronic steering system is not engaged, microprocessor 206 returns to step 301, until the electronic steering system is engaged. If input PA3 is HIGH, microprocessor 206 determines if input PA7 is HIGH (determination 503). If input PA7 is not HIGH, indicating that a user is manually steering left, microprocessor 206 returns to step 301 until the manual steering ends. If input PA7 is HIGH, microprocessor 206 determines if input PA4 is HIGH (determination 505). If input PA4 is not HIGH, indicating that a user is manually steering right, microprocessor 206 returns to step 301 until the manual steering ends. If input PA4 is HIGH microprocessor 206 goes to step 305. Thus, microprocessor 206 determines if the electronic steering system is engaged and if the steering is set.

Figures 6, 7:
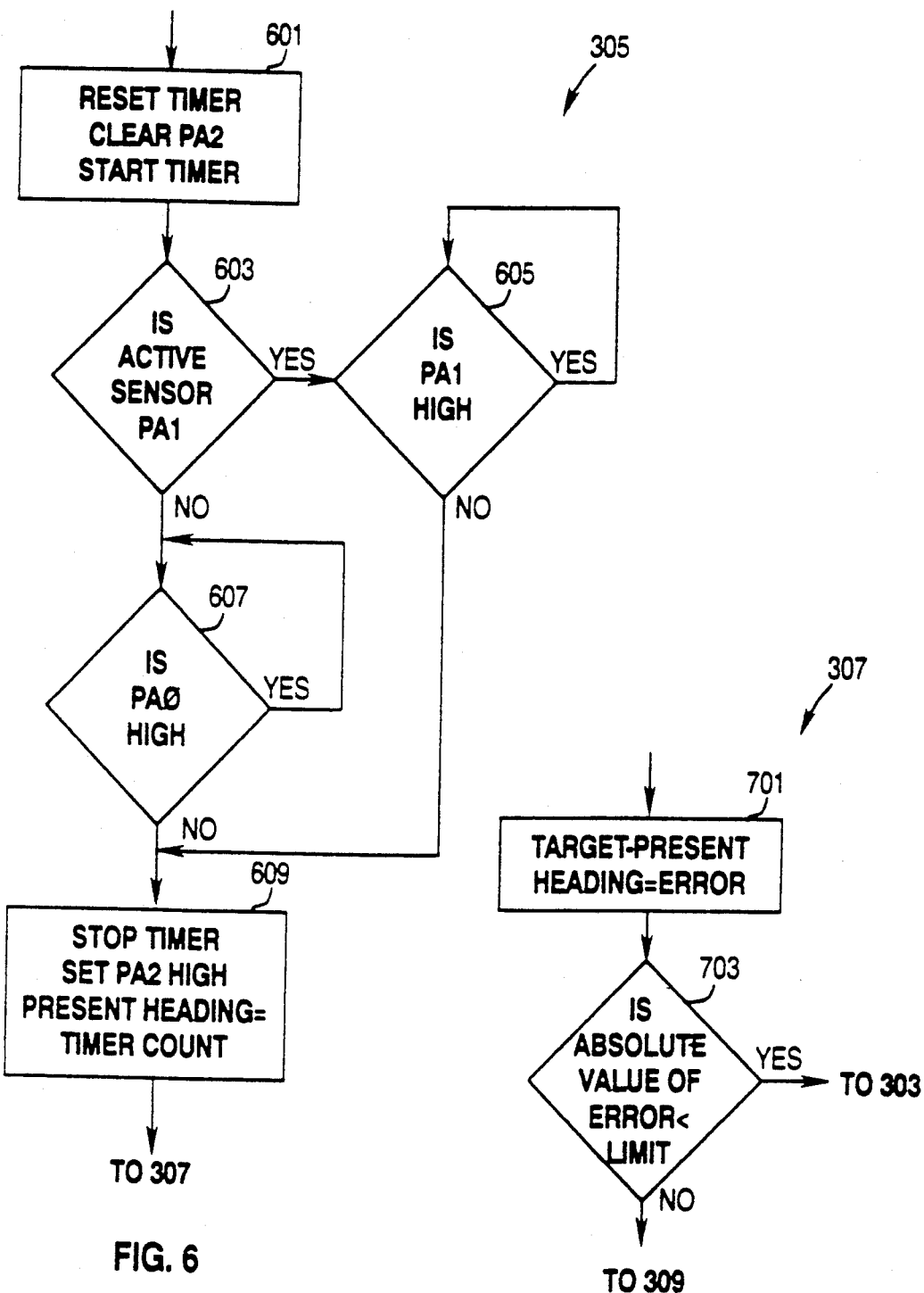
FIG. 6 is a flow chart illustrating a subroutine executed by the microprocessor of the preferred embodiment of the present invention to determine the current heading.
FIG. 7 is a flow chart illustrating a subroutine executed by the microprocessor of the preferred embodiment of the present invention to determine whether a heading correction is needed.

FIG. 6 is a flow chart illustrating a subroutine executed by the microprocessor of the preferred embodiment of the present invention to determine the current heading. Referring to FIG. 6, step 305 includes sub-steps 601-609. Microprocessor 206 clears the timer, clears output PA2 (sends PA2 LOW) to turn off transistor 220, and starts timing (step 601). After timing has begun, microprocessor 206 determines if input PA1 is the "active sensor" (determination 603). If input PA1 is the active sensor, microprocessor 206 monitors input PA1 until input PA1 becomes LOW (determination 605). When input PA1 becomes LOW, microprocessor 206 stops the timer, sets output PA2 (sends PA2 HIGH), to discharge capacitor 225, and sets "present heading" equal to the timer count (step 609).

If, at determination 603, input PA1 is not the active sensor, microprocessor 206 monitors input PA0 until input PA0 becomes LOW (determination 607). When input PA0 becomes low microprocessor 206 stops the timer, sets output PA2 (sends PA2 HIGH), to discharge capacitor 225, and sets "present heading" equal to the timer count (step 609). After step 609 microprocessor 206 goes to determination 307. Thus, microprocessor 206 monitors the correct input (PA0 or input PA1) and stores the time as the "present heading".

FIG. 7 is a flow chart illustrating a subroutine executed by the microprocessor of the preferred embodiment of the present invention to determine whether a heading correction is needed. Referring to FIG. 7, determination 307 includes sub-steps 701 and 703. Microprocessor 206 sets the "error" equal to "target heading" minus "present heading" (step 701), and determines if the absolute value of "error" is less than a predetermined limit (determination 703). If the absolute value is less than the predetermined limit microprocessor 206 returns to determination 303. If the absolute value of "error" is greater than the predetermined limit microprocessor 206 determines the direction motor housing 112 should be turned and appropriately activates steering motor 106 at step 309.

Figure 8:
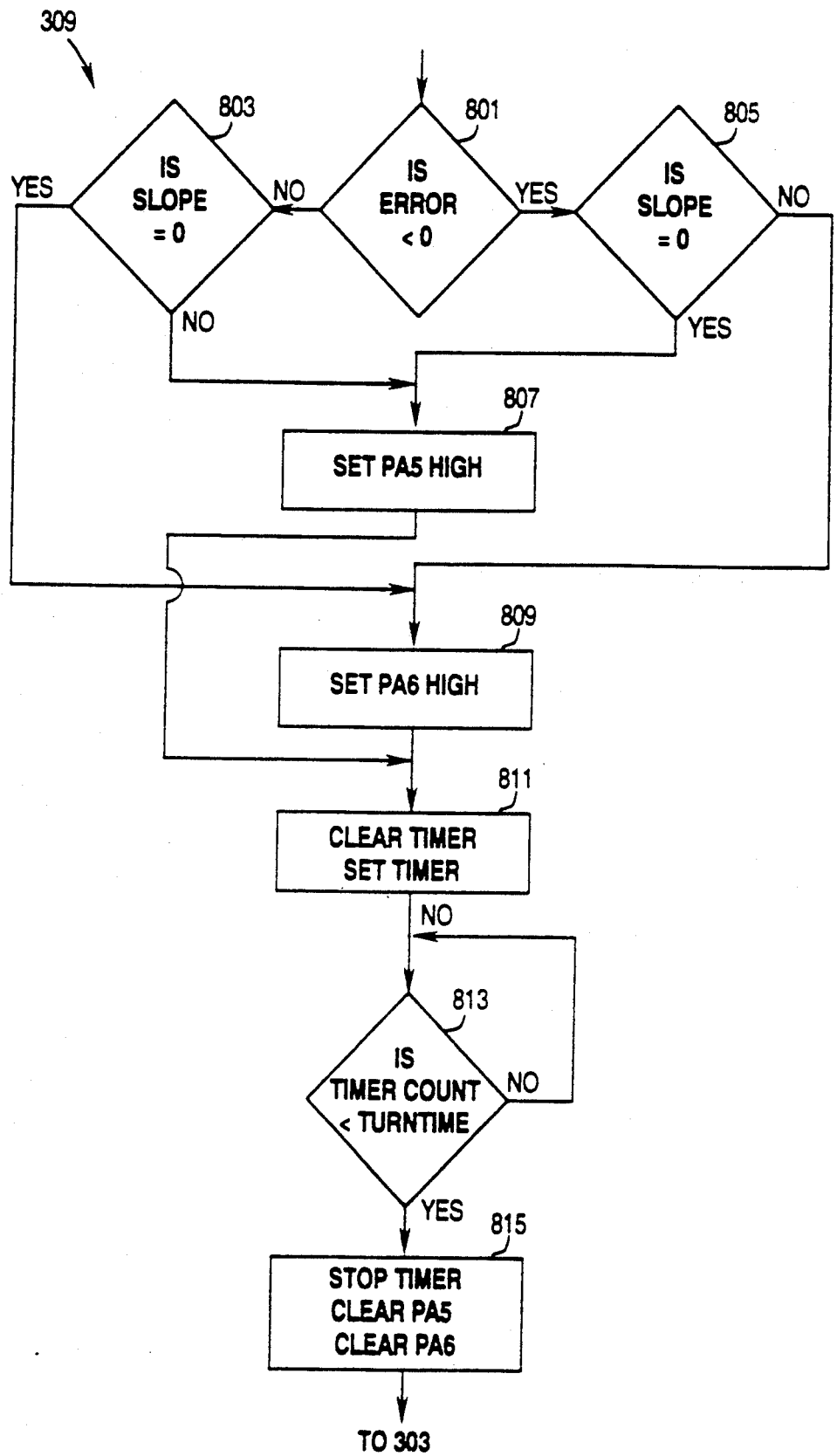
FIG. 8 is a flow chart illustrating a subroutine executed by the microprocessor of the preferred embodiment of the present invention to determine effect a heading correction.
Figure 9C:
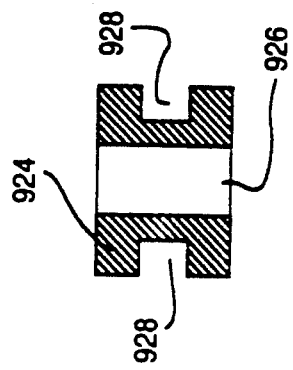
FIG. 9C is a side section view of an isolator used to prevent vibration of the compass illustrated in FIG. 9A.
Figure 9D:
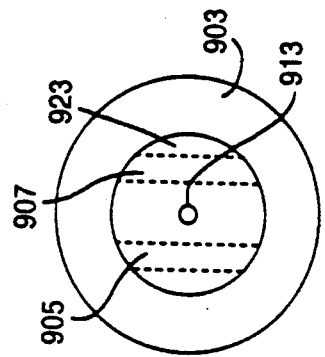
FIG. 9D is a top plan view of the disk of the compass used in the preferred embodiment of the present invention.
Figure 9A:
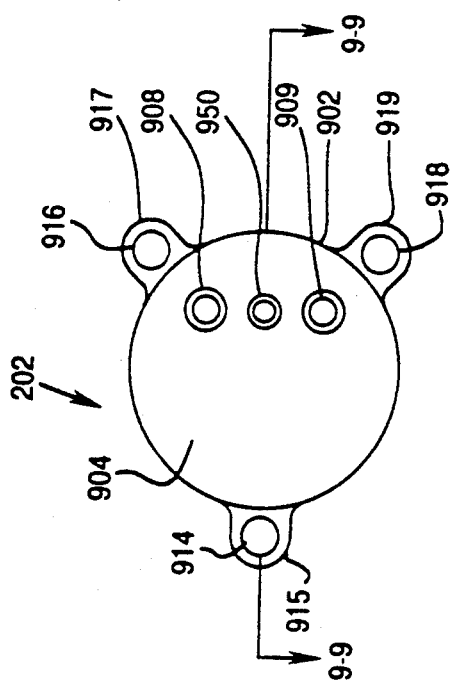
FIG. 9A is a top plan view of the compass used in the preferred embodiment of the present invention.
Figure 9B:
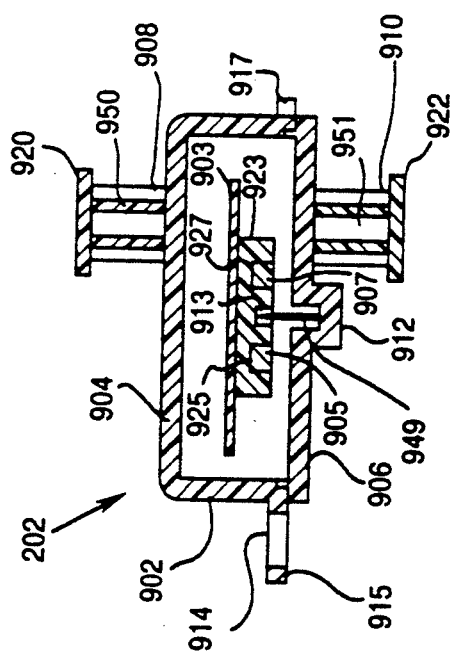
FIG. 9B is a side section view of the compass illustrated in FIG. 9A, taken along line 9—9 of FIG. 9A.

FIG. 8 is a flow chart illustrating a subroutine executed by the microprocessor of the preferred embodiment of the present invention to determine effect a heading correction. Step 309 is comprised of sub-steps 801-817 (FIG. 8). If microprocessor 206 determines that a correction is needed at determination 307, microprocessor 206 determines the state of "error" (determination 801) and "slope" (determinations 803 and 805) to properly activate steering motor 106 and turn motor housing 112.

If "error" is less than zero and "slope" is zero, microprocessor 206 sets output PA5 (sends PA5 HIGH) (step 807), causing steering motor 106 to turn motor housing 112 right. If "error" is less than zero and "slope" is not zero, microprocessor 206 sets output PA6 (sends PA6 HIGH), step 809, causing steering motor 106 to turn motor housing 112 left. If "error" is not less than zero and "slope" is zero, microprocessor 206 sets output PA6 (step 809), causing steering motor 106 to turn motor housing 112 left. If "error" is not less than zero and "slope" is not zero, microprocessor 206 sets output PA5 (step 807), causing steering motor 106 to turn motor housing 112 right.

After output PA5 or output PA6 is set (sent HIGH), microprocessor 206 clears and starts the timer (step 811) and monitors the timer until a predetermined time elapses (determination 813). When the predetermined time elapses microprocessor 206 stops the timer and clears outputs PA5 and PA6 (sends both PA5 and PA6 LOW), to stop steering motor 106 from turning motor housing 112 and returns to determination 303 (step 815).

It is to be understood that, while the detailed drawings and specific examples given describe preferred embodiments of the invention, they are for the purpose of illustration only, and that the apparatus of the invention is not limited to the precise details and conditions disclosed and that various changes may be made therein without departing from the spirit of the invention which is defined by the following claims.

I claim:

1. An apparatus for controlling the heading of a watercraft having a propulsion device, said propulsion device generating a thrust and positioned relative to said watercraft such that said propulsion device pulls said watercraft, the apparatus comprising:
   direction means for directing said thrust;
   control means for controlling said direction means;
   feedback means for providing a feedback signal to said control means, said feedback signal being indicative of the direction of said thrust;
   heading designating means for designating a desired heading, said heading designating means providing a desired heading signal to said control means, said desired heading signal being representative of said heading direction;
   said direction means, said control means, said feedback means, and said heading designating means cooperating to maintain said heading of watercraft in said desired heading;
   wherein said propulsion device has a variable orientation, said orientation being selectable, said direction of thrust responsive to said orientation, and wherein said direction means effects a change in said orientation in response to said feedback signal; and
   wherein said feedback means includes a compass in substantially fixed relationship to said propulsion device, said compass providing said feedback signal in response to said orientation.

2. The apparatus of claim 1 wherein said heading designating means includes a foot pedal, said foot pedal having a variable angular position, said angular position being selectable, and said desired heading signal being responsive to said angular position.

3. The apparatus of claim 2 wherein said desired heading signal is indicative of said angular position.

4. The apparatus of claim 1 wherein said heading designating means includes a hand lever.

5. The apparatus of claim 1 wherein said feedback signal is a digital signal; said desired direction signal is a digital signal; and said control means includes a microprocessor.

6. The apparatus of claim 5 wherein said microprocessor compares said feedback signal with said desired heading signal and provides an output signal in response to said comparison.

7. The apparatus of claim 1 wherein said feedback signal is an analog signal and said desired direction signal is an analog signal.

8. The apparatus of claim 1 wherein said heading designating means includes an electric motor for altering said orientation.

9. An apparatus for controlling the heading of a watercraft having a propulsion device, said propulsion device generating a thrust for pulling said watercraft, the apparatus comprising:
   a single sensor means for sensing the heading of said thrust;
   control means for controlling said thrust heading;
   feedback means for providing a feedback signal to said control means, said feedback signal being indicative of said thrust heading;
   heading designating means for designating a desired heading, said heading designating means providing a desired heading signal to said control means, said desired heading signal being representative of said heading direction;
   said control means, in response to said feedback signal, maintaining said heading of watercraft in said desired heading;
   wherein said propulsion device has a variable orientation, said orientation being selectable, said direction of thrust responsive to said orientation, and wherein said control means effects a change in said orientation in response to said feedback signal; and
   wherein said feedback means includes a compass in a predetermined relationship with said propulsion device, said compass providing said feedback signal in response to said orientation.

10. The apparatus of claim 9 wherein said propulsion device is a trolling unit.

11. The apparatus of claim 9 wherein said heading designating means includes a user actuated switch, said switch having a variable position, said variable position being selectable; said desired heading signal being responsive to said variable position.

12. The apparatus of claim 9 wherein said feedback signal is a digital signal; said desired heading signal is a digital signal; and said control means includes a microprocessor.

13. The apparatus of claim 9 wherein said propulsion device precedes said watercraft in said desired heading.

14. The apparatus of claim 9 wherein said control means includes an electric motor for altering said orientation.

15. The apparatus of claim 14 wherein said user actuated switch is a foot lever.

16. The apparatus of claim 15 wherein said desired heading signal is indicative of said variable position.

* * * * *